United States Patent [19]

Membrino et al.

[11] 3,912,884

[45] Oct. 14, 1975

[54] COMMUNICATION MONITORING SYSTEM

[75] Inventors: Robert J. Membrino, Silver Spring; James J. Ridgell, Jr., Elkridge, both of Md.

[73] Assignee: The Singer Company, New York, N.Y.

[22] Filed: Aug. 5, 1974

[21] Appl. No.: 494,389

[52] U.S. Cl. .................... 179/175.3 R; 179/175.2 C

[51] Int. Cl.$^2$ .......................................... H04B 3/46

[58] Field of Search 179/175.2 C, 175.3 R, 175.31 R, 179/170.2; 333/10

[56] References Cited

UNITED STATES PATENTS

| | | | |
|---|---|---|---|
| 3,560,669 | 2/1971 | Foulkes et al. | 179/170.2 |
| 3,637,955 | 1/1972 | Tilly et al. | 179/175.31 R |
| 3,823,275 | 7/1974 | La Marche et al. | 179/170.2 |

*Primary Examiner*—Douglas W. Olms
*Attorney, Agent, or Firm*—William Grobman; James C. Kesterson

[57] ABSTRACT

The invention of this disclosure comprises a system for monitoring the flow of information along a single transmission path where the information may be transmitted from both directions. The apparatus of this invention comprises means for receiving information moving along the transmission path in either direction, means for delaying that information, a first directional path and a second directional path, means for inhibiting the flow along one of said paths by the receipt of information moving along the other path, and means for monitoring the information along the two paths by any suitable means.

9 Claims, 2 Drawing Figures

COMMUNICATION MONITORING SYSTEM

BACKGROUND OF THE INVENTION

1. Field of the Invention

This invention relates to electronic circuits, and more particularly to devices for monitoring information being transmitted along an information transmission path.

2. Description of the Prior Art

There are many information systems where information is transmitted between a plurality of transmitters and receivers along a single transmission path. Such systems usually include means for preventing the interference of the transmission of information from one of the sources with the simultaneous transmission of information from another of the sources. Thus, although the single transmission path carries information in both directions, it carries such information in only one direction at any time. In monitoring the information flowing through the transmission path, it is difficult, if not impossible, to determine the source of the information, and it is often important to know the source.

In the past, information being transmitted along a transmission path was monitored by tapping the path itself. However, transmission path taps merely sample the information being transmitted without identifying the source of that information. Since, in some systems it is important to ensure that the response to the information from each source is inducing the proper responses in the other devices, it is important to be able to identify the source of all information being monitored.

SUMMARY OF THE INVENTION

This invention overcomes the disadvantages of the prior art by providing in a transmission line tap, two separate channels through each of which information can travel in only one direction. The paths are so arranged that information which originates in one source at one end of the transmission path passes through one channel, and information originating at another source at the other end of the transmission path travels through the other channel. Each channel can be monitored by suitable equipment, and each path identifies the source of the information passing therethrough.

It is an object of this invention to provide a new and improved electronic system.

It is another object of this invention to provide a new and improved electronic system for monitoring information flowing along a transmission path.

It is a further object of this invention to provide a new and improved system for monitoring information being transmitted along a single transmission path and for identifying the source of that information.

Other objects and advantages of this invention will become apparent as the following description proceeds, which description should be considered together with the accompanying drawings.

DESCRIPTION OF THE PREFERRED EMBODIMENT

Figure 1:
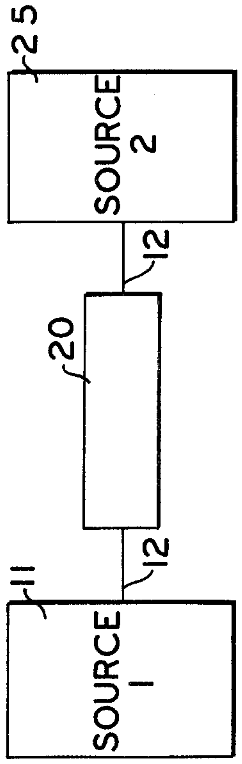
FIG. 1 is a block diagram of a transmission path with the system of this invention inserted therein.

Referring now to the drawings in detail, and more particularly to FIG. 1, the reference character 11 designates a first source of information which is connected to one end of a transmission path 12. The other end of the transmission path 12 is connected to a second source 25 of information. As shown in FIG. 1, the transmission path 12 is broken at any convenient location and a monitoring system 20 according to this invention is inserted therein. The monitoring device 20 does not interfere with the transmission of information between the two sources 11 and 25 but provides a means for monitoring that information.

In operation, the system of FIG. 1 serves as a standard information transmission system. In most modern information systems, the sources 12 and 25 are most likely digital sources — sources of digital data such as digital computers. However, these sources could just as well be sources of other forms of information such as voice communication, analog signals, etc. By the same token, the transmission path 12 is shown and will be considered to be a twisted pair of wires for this description but the transmission path could just as well comprise a radio channel, coaxial cable, etc. As shown in FIG. 1, the transmission path 12 is cut, and the monitor 20 is inserted in series therewith. This means that all of the information being transmitted along the transmission path 12 passes through the monitor 20. The monitor 20 is so constructed, as will be explained in detail below, that information being transmited through the transmission path 12 in both directions passes through the monitor 20 in the proper direction, thus the monitor 20 indicates in which direction the information is flowing.

Figure 2:
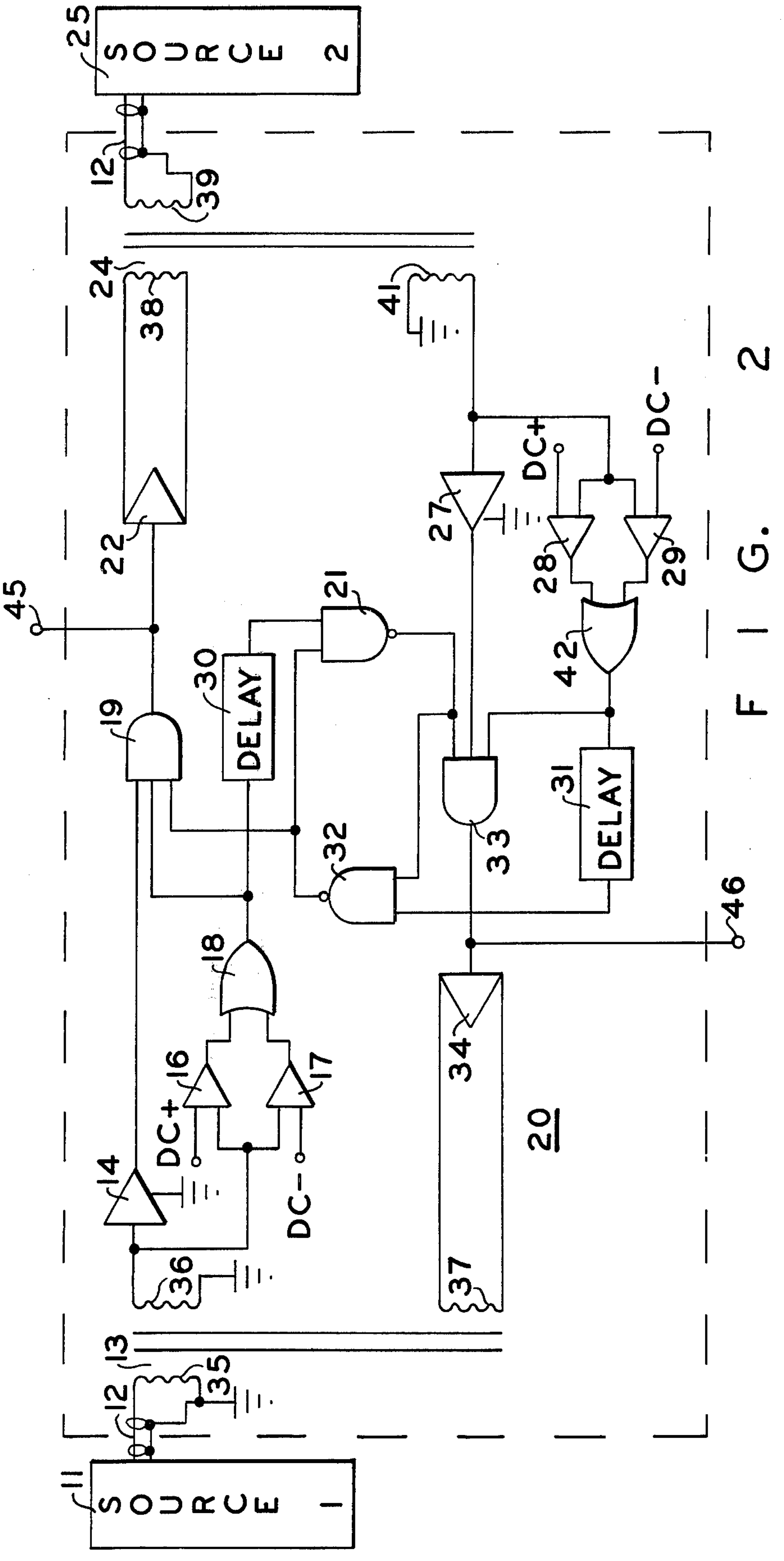
FIG. 2 is a schematic block diagram of the monitoring system of FIG. 1.

The details of construction of the monitor 20 are shown in FIG. 2. In FIG. 2, the source 11 is shown connected to one end of the transmission line 12 with the source 25 connected to the other end of the same line. The line 12 is shown cut and each free end is connected to one winding of a communication transformer 13 and 24. On the same core as one winding 35 of the transformer 13 are two other windings 36 and 37, and two windings 38 and 41 are mounted on the same core as one winding 39 of the transformer 24. In transformer 13 the winding 35 is a primary winding for the secondary winding 36, but is a secondary winding for the primary winding 37. Similarly, in transformer 24, the winding 39 is a primary winding for the secondary winding 41, but is a secondary winding for a primary winding 38. The operation of the windings will be explained in greater detail below.

The winding 36 is grounded at one end and has its other end connected to the inputs of an impedance matching amplifier 14 and to the inputs of a pair of voltage sensitive operational amplifiers 16 and 17. The outputs of the amplifiers 16 and 17 are applied through an OR gate 18 to the inputs of an AND gate 19. The output of the amplifier 14 serves as another input to the gate 19. The output of the gate 19 is applied as an input to another impedance matching amplifier 22 which matches its input with the primary winding 38. The output from the OR gate 18 is also applied to the input of a delay 30, the output of which is applied as an input to a NAND gate 21. The output from the gate 21 is applied to one input of an AND gate 33 and to one input of a NAND gate 32. The output from the gate 32 is the third input to the gate 19. The output from the gate 33 is applied to the input of an impedance matching amplifier 34 which drives the primary winding 37. The secondary winding 41 of the transformer 24 is connected to the input of an impedance matching amplifier 27, whose output is a second input to the gate 33. The secondary winding 41 is also connected to the inputs of the voltage-sensitive operational amplifiers 28 and 29, whose outputs are connected to the inputs of an OR gate 42. The output of the gate 42 is applied to the input of a delay 31 and to the third input of the gate 33. The output of the delay 31 is applied to the other input to the gate 32. An output terminal 45 is connected to the output of the gate 19, and output terminal 46 is connected to the output of the gate 33.

The monitor 20 is organized into two transmission paths and two control circuits, one for each direction of information flow. Information coming from the source 11 travels through the amplifier 14, the gate 19, the amplifier 22, primary winding 38 and secondary winding 39 to the input of source 25. On the other hand, the information from the source 25 passes through the primary 39, the secondary 41, amplifier 27, gate 33, amplifier 34, primary 37, and secondary 35 to the input of the source 11. From this it can be seen that information passing through the monitor 20 passes through one channel or the other depending upon the direction of flow of that information. Thus, the source of the information in the transmission line 12 at any time can be readily identified. Information passing through the channel comprising amplifier 14, gate 19, and amplifier 22 could circulate indefinitely since the primary 38 would induce similar signals in the winding 41. Winding 41 would then apply the same signals to the channel comprising amplifier 27, gate 33, and amplifier 34 and ringing would result. Gates 19 and 33 are provided to prevent this circulation of currents which would result in ringing. When information is passing through the channel which includes amplifiers 14 and 22 and gate 19, that information is also applied to the amplitude sensitive amplifiers 16 and 17. Information for this purpose is defined as all signals having amplitudes greater than a selected voltage, signals with lower voltages are noise. Signals greater than the biasing voltages — of either polarity — applied to the amplifiers 16 and 17 are considered to be information signals rather than noise. The outputs from both of the amplifiers 16 and 17 are applied to the input of the gate 19 to condition that gate, and also through the delay 30 to the input of the gate 21. The output of the gate 21 is a negative signal which is applied to the inputs of gates 32 and 33 to inhibit both gates. This means that the gate 32 applies a positive input to the gate 19 to open that gate and permit the passage of information therethrough. Since gate 33 is inhibited, no information can pass therethrough. Thus, the control circuit which includes delay 30 and gate 21 controls the passage of information through the channel which includes gate 33; and the control circuit including the delay 31 and gate 32 controls the passage of information through the channel which includes gate 19. The delay 30 is used to prevent the gate 33 from opening until sufficient time has elapsed for all of the information signals to have decayed in the transformer 24 so that ringing does not start on the trailing edge of the information transmission. Since the ringing current must reach the transformer 24, be induced into the secondary 41 and pass through the amplifier 27 before it can regenerate, there is sufficient delay due to the circuitry of the transmission channel to equal the delay 30 and 31 in the control circuits.

The transmission of information through each of the two channels is controlled by the gates 19 and 33. As indicated above, two control loops are provided, one loop to control each of these two gates 19 and 33. The information which opens gate 19 causes 33 to close, and the information which opens gate 33 causes gate 19 to close. Thus, information passing through the circuit 20 is permitted to pass in only one direction at a time. The two output terminals 45 and 46 which are respectively connected to the outputs of the two gates 19 and 33 may be connected to suitable monitoring equipment to monitor the information passing through the transmission path 12. When information is received from the terminal 45, that information is known to originate in the source 25. Thus, the monitoring system of this invention not only provides means for monitoring the information being transmitted through a bi-directional transmission path, but it also provides means for indicating in which direction that information is passing through the transmission path.

The above specification has described a new and improved system for monitoring bi-directional information transmission path. It is realized that the above description may indicate to those skilled in the art additional ways in which the principles of this invention may be used without departing from its spirit. It is, therefore, intended that this invention be limited only by the scope of the appended claims.

What is claimed is:

1. A system for monitoring information and determining from what source that information is being transmitted in a transmission path, said system comprising:

a. a path for transmitting information;

b. a plurality of sources of information, and means for coupling each of said sources to said path;

c. an apparatus coupled to said path for monitoring information being transmitted along said path in either direction;

d. said apparatus including at least a first and a second information channel, one such channel for each direction in which information is transmitted through said path;

e. means in said system for restricting the flow of information in each channel to a selected path direction;

f. means coupled to each channel for monitoring information being transmitted therethrough; and g. means in each of said channels responsive to the presence of information in one of said channels for preventing the flow of information through the other of said channels.

2. The system defined in claim 1 further including means in each of said channels for the prevention of circulating currents which cause ringing in said channels.

3. The system defined in claim 1 wherein the means for preventing the flow of information comprises:

a. a first control network connected to said transmission path adjacent one of said sources;

b. a second control network connected to said transmission path adjacent another of said sources;

c. a first time delay whose input is coupled to said one source and whose output is coupled to said second control network;

d. a second time delay whose input is coupled to said other source and whose output is coupled to said first control network;

e. a first gate is said second control network;

f. means for coupling an input of said first gate to the output of said first time delay so that said first gate inhibits the flow of information in said second information channel when information is being transmitted in said first information channel;

g. a second gate in said first control network; and h. means for coupling an input of said second gate to the output of said second time delay so that said second gate inhibits the flow of information in said first information channel when information is being transmitted in said second information channel.

4. The system defined in claim 1 wherein said restricting means includes:

a. a first uni-directional amplifier in said first information channel having its input coupled to said transmission path;

b. a second uni-directional amplifier in said second information channel having its input coupled to said transmission path;

c. and wherein said first time delay has its input connected to the input of said first uni-directional amplifier for delaying the transmission of signals applied to said first information channel; and said second time delay has its input connected to the input of said second uni-directional amplifier for delaying the transmission of signals applied to said second information channel;

d. at least one information gate in said second information channel having an input coupled to the output of said first time delay to control the transmission through said second information channel; and e. at least another information gate in said first information channel having an input coupled to the output of said second time delay to control the transmission through said first information channel.

5. The system defined in claim 4 further including in each control network noise and information distinguishing apparatus comprising:

a. a first amplitude sensitive amplifier positively biased at a reference voltage level for noise;

b. a second amplitude sensitive amplifier negatively biased at a reference voltage level for noise; and c. means for interposing said first and second amplitude sensitive amplifiers between said source and said delay.

6. The system defined in claim 1 wherein the path for transmitting information is a coaxial cable.

7. A system for monitoring information which is propagated by information sources through a medium in which information is sent, and determining from which source the information is being transmitted, said system comprising:

a. a transmission medium in which information is being propagated;

b. at least a first and a second transceiver coupled to said transmission medium, which transceivers receive, process, and transmit information;

c. at least two means coupled to said transceivers, each of said means conveying the information transmitted by said transceivers in a predetermined direction; and d. at least two devices coupled to said means to determine from which means information is being transmitted.

8. The system defined in claim 7 wherein said means comprises:

a. a first information channel coupled to said first transceiver;

b. a second information channel coupled to said second transceiver;

c. means for preventing the flow of information in said first channel when information is being sent in said second channel; and d. means for preventing the flow of information in said second channel when information is being sent in said first channel.

9. The system defined in claim 8 wherein said preventing means comprises:

a. a first control network coupled to said first information channel;

b. a second control network coupled to said second information channel;

c. a first time delay whose input is connected to said first source and whose output is connected to said second control network;

d. a second time delay whose input is connected to said second source and whose output is connected to said first channel;

e. a first gate in said second control network;

f. means for coupling an input of said first gate to the output of said first time delay so that said first gate inhibits the flow of information in said second information channel when information is being transmitted in said first information channel;

g. a second gate in said first control network; and h. means for coupling an input of said second gate to the output of said second time delay so that said second gate inhibits the flow of information in said first information channel when information is being transmitted in said second information channel.

* * * * *